United States Patent [19]

Scott et al.

[11] Patent Number: 5,044,858

[45] Date of Patent: Sep. 3, 1991

[54] VEHICLE WITH LATERAL MOVING LIFT

[75] Inventors: Melvin E. Scott, Bristol; Alfred D. McCue, Abingdon, both of Va.

[73] Assignee: Simmons-Rand Company, Bristol, Va.

[21] Appl. No.: 550,243

[22] Filed: Jul. 11, 1990

Related U.S. Application Data

[63] Continuation of Ser. No. 393,860, Aug. 11, 1989, abandoned, which is a continuation of Ser. No. 183,549, Apr. 18, 1988, abandoned, which is a continuation-in-part of Ser. No. 908,179, Sep. 17, 1983, abandoned.

[51] Int. Cl.⁵ .......................................... E04G 21/14
[52] U.S. Cl. ...................................... 414/10; 414/687; 414/590; 180/8.1; 180/203
[58] Field of Search .............. 414/633, 634, 665, 666, 414/589, 590

[56] References Cited

U.S. PATENT DOCUMENTS

| | | | |
|---|---|---|---|
| 2,738,081 | 3/1956 | Lee | 414/10 |
| 2,753,066 | 7/1956 | Arnot | 414/633 |
| 2,780,377 | 2/1957 | Glenn, Jr. et al. | 414/607 X |
| 3,472,408 | 10/1969 | Hendricks et al. | 414/633 X |
| 3,515,300 | 6/1970 | Hollenbach | 414/633 |
| 3,532,241 | 10/1970 | Eriksson | 414/705 |
| 3,539,022 | 11/1970 | Berg | 414/705 X |
| 3,587,882 | 6/1971 | Friday et al. | 414/633 X |
| 3,599,818 | 8/1971 | Stanton | 414/607 |
| 3,850,322 | 11/1974 | Miles et al. | 414/607 |
| 3,885,694 | 5/1975 | Uchida et al. | 414/705 |
| 4,034,822 | 7/1977 | Stedman | 280/492 X |
| 4,079,955 | 3/1978 | Thorpe et al. | 280/492 X |
| 4,199,299 | 4/1980 | Petitto, Sr. et al. | 414/687 |
| 4,245,714 | 1/1981 | Kersey | 280/492 X |
| 4,273,353 | 6/1987 | Holmes | 280/492 X |
| 4,290,622 | 9/1987 | Horvath | 280/492 X |
| 4,314,789 | 2/1982 | Luigi | 414/705 X |
| 4,414,878 | 1/1984 | van der Lely | 280/492 X |
| 4,444,409 | 4/1984 | Garrison | 280/492 |
| 4,648,769 | 3/1987 | Stirling | 414/705 X |
| 4,692,085 | 9/1987 | Parsons | 414/687 X |

FOREIGN PATENT DOCUMENTS

| | | | |
|---|---|---|---|
| 976385 | 7/1963 | Fed. Rep. of Germany | 414/665 |
| 1484747 | 4/1969 | Fed. Rep. of Germany | 180/8.1 |
| 2511446 | 9/1976 | Fed. Rep. of Germany | 280/492 |

OTHER PUBLICATIONS

"Timberjack", Timberjack Co., Woodstock, Ontario, Canada 4-1984.
"Standard Lift Truck Systems", Standard Manufacturing Co., Inc., Dallas, Texas, 1968.

Primary Examiner—Robert J. Spar
Assistant Examiner—William M. Hienz
Attorney, Agent, or Firm—James R. Bell; David W. Tibbott

[57] ABSTRACT

A lift vehicle for moving mine roof supports has a main drive section with a forward lift platform and a rearward articulated battery section. The articulating connection between the main section and the battery section has a clevis and pin assembly and a rotatable sleeve bearing connection. The sleeve bearing is rigidly connected to the clevis and pin assembly and rotatably connected to the battery section. The lift platform is rotatable about a horizontal axis to give it a tilting capability and is rotatable about a vertical axis to assume angled positions to either side of the vehicle.

3 Claims, 3 Drawing Sheets

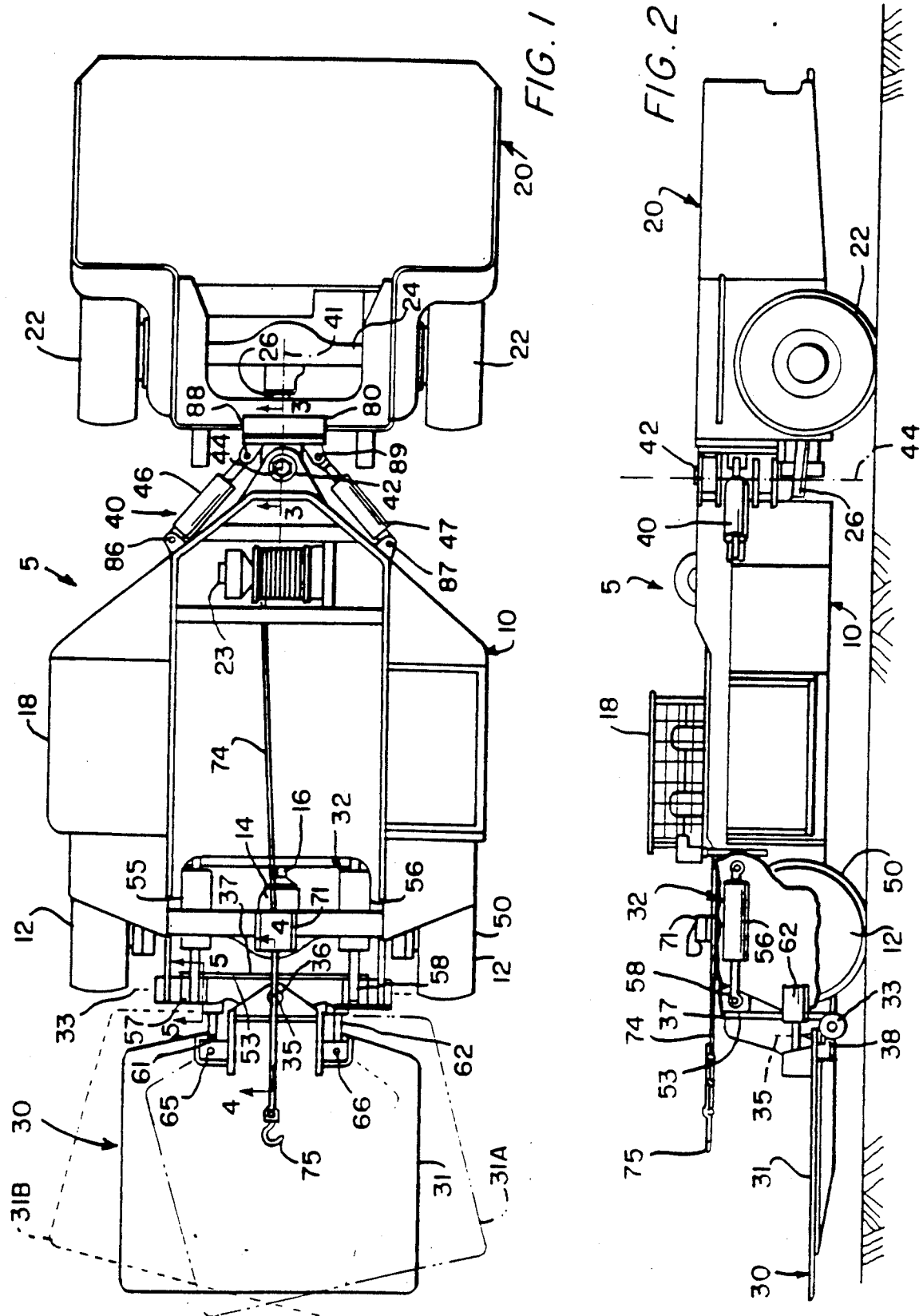

VEHICLE WITH LATERAL MOVING LIFT

This application is a continuation of applicants' application Ser. No. 07/393,860, filed Aug. 11, 1989, now abandoned, which was a continuation of applicants' application Ser. No. 07/183,549, filed Apr. 18, 1988, now abandoned, which was a continuation-in-part of applicants' application Ser. No. 06/908,179, filed Sept. 17, 1986, now abandoned.

This invention relates to lift vehicles, particularly lift vehicles used to move heavy equipment such as roof supports in longwall mining operations.

Lift vehicles normally have a lift plate mounted on the front of the vehicle that may be raised or lowered vertically and tilted about a horizontal axis. In applications that move significantly heavy equipment, such as mine roof supports in longwall installations, the lift plates are rotatable about a horizontal axis and do not provide for significant vertical movement. Because of the maneuverability required, these machines are typically articulated with two sections, one carrying the operating mechanisms and driver and the other carrying the battery power supply.

With this invention, a new lift vehicle that is particularly effective for moving roof supports and the like in underground mining and similar operations has a lift mechanism that increases its versatility and moving capability and an articulation and rotation joint oriented in such a way that gives it greater stability and increased maneuverability. Other advantages and objectives of this invention will be apparent from the following description.

FIG. 1 is a simplified top view of a lift vehicle according to this invention;

FIG. 2 is a side view of the vehicle shown in FIG. 1;

Figure 5:
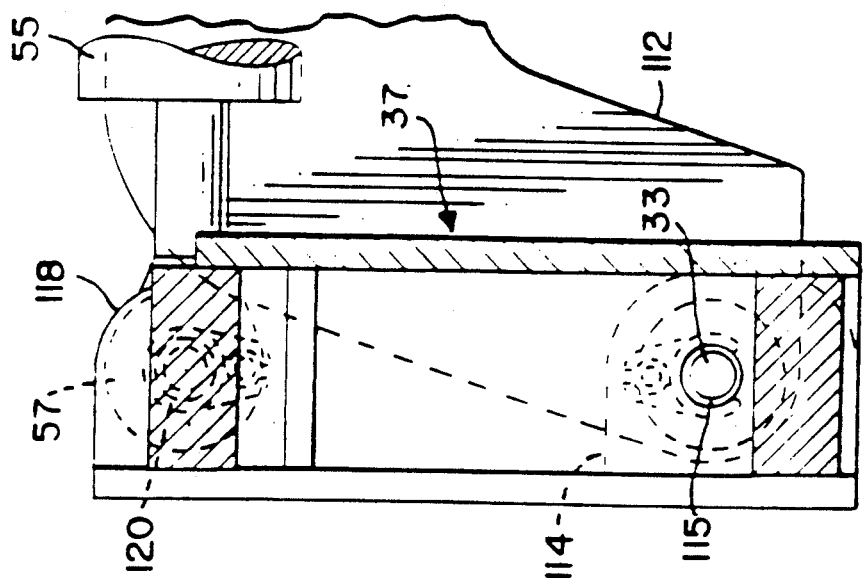
Figure 4:
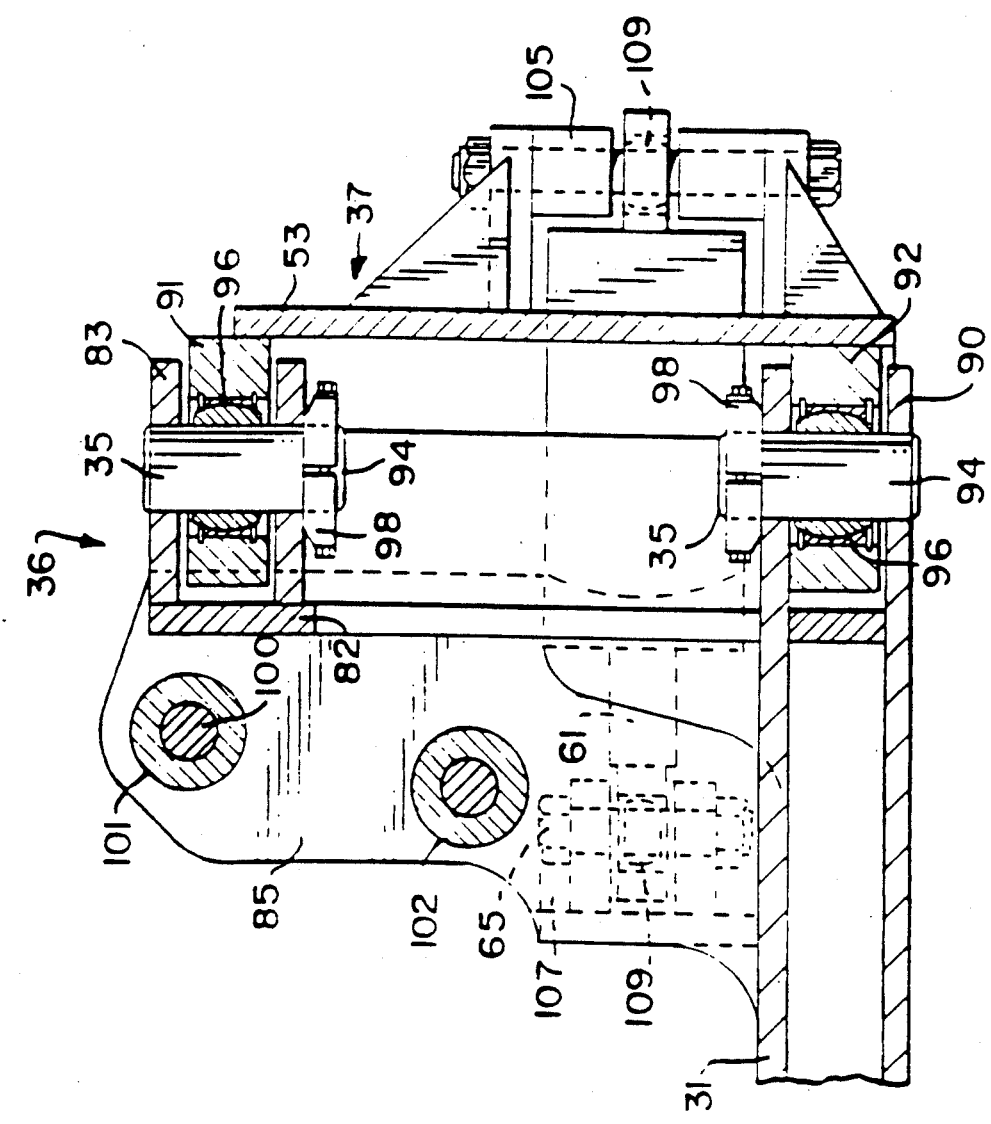

FIGS. 4 and 5 are sections taken along line 4—4 and line 5—5 in FIG. 1, respectively.

Referring to FIGS. 1 and 2, a lift vehicle 5 has a main drive section 10, a separate battery section 20 adjacent the rear of the main drive section, a lift plate assembly 30, an articulating means 40 for connecting battery section 20 to main drive section 10 and a power means 50 for driving the vehicle. Power means 50 comprises, drive wheels 12 on main section 10 connected to be driven through an axle 14 by a driving means such as a gear box driven by an electric motor (not shown) in any manner known in the art through a drive shaft 16, and drive wheels 22 on battery section 20 similarly connected to the driving means through an axle 24 and a drive shaft 26.

Main drive section 10 contains a control station 18 of any type known in the art for the operator. Battery section 20 comprises batteries (not shown) connected to furnish power for the operation of the vehicle in any manner known in the art through electrical cables (not shown) running from the battery section to the main drive section.

A lift plate assembly 30 is mounted at the front of main drive section 10 and comprises a lift plate 31, a means 32 for moving the lift plate about a horizontal axis 33 transverse to the vehicle and a means for moving the lift plate about a vertical axis 35 to selected positions as exemplarily shown by the dotted line positions 31A and 31B shown in FIG. 1.

Means for moving the lift plate about vertical axis 35 comprises a vertical pin assembly 36 connected to a back plate assembly 37 connected to the main section to be rotatable about horizontal axis 33. Lift plate 31 is rotated about axis 35 of pin assembly 36 by a pair of hydraulic cylinders 61 and 62 that are connected to the back plate assembly 37 at respective joints (not shown) in any manner known in the art and to lift plate 31 at joints 65 and 66, respectively. By operation of cylinders 61 and 62, lift plate 31 is laterally movable about axis 35 of the pin assembly to and between the dotted line positions 31A and 31B shown in FIG. 1.

Referring to FIGS. 4 and 5, the lift plate 31 further includes a pair of transversely-spaced side plates 85 having their lower edges welded to the top of the lift plate 31 and joined together at the top by a horizontal cross bar 82 extending therebetween. The rear edge of the lift plate 31 includes a pair of rearwardly-extending vertically-spaced flanges 90 and the cross bar 82 includes a similar pair of flanges 83 extending rearwardly from its rear face and spaced vertically above the flanges 90. These pairs of flanges 83 and 90 form bifurcated jaws opening rearwardly to receive between them a pair of vertically spaced bearing supports 91 and 92 extending forwardly from the back plate 53 of the back plate assembly 37.

A swivel pin 94 extends between each pair of flanges 83 and 90 and each bearing support 91 and 92 includes a ball and socket bearing assembly 96 receiving a swivel pin 94 to form bearings located on the axis 35. Each swivel pin 94 is locked in place in the corresponding flanges by a split clamp 98 having one half welded to one of the flanges.

Connecting the lift plate 31 to the back plate assembly 37 by a pair of vertically spaced ball and socket bearing assemblies 96 (pivoted joints) allows the axes of the bearing assemblies 96 to shift from aligned positions along the axis 35 to accommodate any misalignment problems of the axes of the bearing assemblies 96 during manufacture as well as to accommodate any bending of the structural members adjacent the bearings 96 during times of high stress of the lift plate 31 and back plate assembly 37.

The back plate assembly 37 further includes two pairs of brackets 105 extending rearwardly from the rear of the back plate 53 and transversely located outwardly of the side plates 85. A bifurcated bracket 107 is attached to the outer surface of each side plate 85 to hold the pins 65 and 66 and the swing cylinders 61 and 62 are interconnected between the brackets 107 at their forward ends and the brackets 105 at their rear ends. Each such connection includes a ball and socket bearing 109 to allow the swing cylinders 61 and 62 to swing universally about their ends as the lift plate 31 swings about the axis 35. The cylinders 61 and 62 are operated in a conventional manner with one being extended and the other being retracted to swing the lift plate 31 about axis 35.

It is readily seen from the foregoing that the lift plate 31 is supported on the back plate assembly 37 for swinging about the axes 35 and the swing cylinders 61 and 62 accomplish such swinging by being operated together in opposite directions and by being connected between the lift plate 31 and back plate assembly 37 on the opposite sides of the swinging axis 35. All of this motion is handled without reference to the body of the main drive section 10 of the vehicle 5.

Means 32 for moving the lift plate about horizontal axis 33 comprises a back plate 53 in back plate assembly 37 and two hydraulic cylinders 55 and 56 connected to the main structure at respective joints (not shown) in any manner known in the art and to the back plate at joints 57 and 58, respectively.

The main drive section 10 includes a pair of transversely spaced vertical plates 112 extending forwardly from the front end of the body of the main drive section and the back plate assembly 37 is pivoted on the plates 112 for tilting about the horizontal tilting axis 33 by connections which include a pair of bifurcated members 114 fixed to the back plate assembly 37 at its lower end and receiving the ends of the plates 112 with a pin 115 extending between the members 114 and carrying a suitable bearing to provide the horizontal tilting axis 33. It will be noted in FIG. 5 that the horizontal tilting axis 33 is located near the plane of the upper surface of the lift plate 31.

The upper part of the back plate assembly 37 carries a pair of rearwardly opening bifurcated brackets 118 for receiving the forward ends of the tilt cylinders 55 and 56 on the joints 57 and 58. This connection further comprises pins 120 and a suitable bearing forming the joints 57 and 58. As the tilt cylinders are extended, the lift plate 31 is tilted forwardly and the retraction of the tilt cylinders tilts the lift plate 31 upwardly.

A drag cable 74 is connected to a drive winch 23 through a roller guide 71. Drive winch 23 is mounted on main drive section 10 and moves drag cable 74 and a hook 75 for use in moving roof supports for certain types of operations.

The side plates 85 are further interconnected by a pair of rods 100 extending between them and carrying rollers 101 and 102, all located forward of the axis 35. The rollers 101 and 102 are useful for guiding the winch cable 74 to prevent such cable from rubbing on the surfaces of the vehicle. The upper roller 101 is located slightly above the brace bar 82 and flanges 83 to keep the cable 74 from engaging the adjacent surfaces. The winch cable 74 can be reeved over the top of the roller 101 and rearwardly and under the roller 102 to allow the cable 74 to pull at a lower level in cases where if is more desirable to locate the cable 74 at a lower level, such as, for example, when the load (roof support) could topple if pulled from a higher level.

Figure 3:
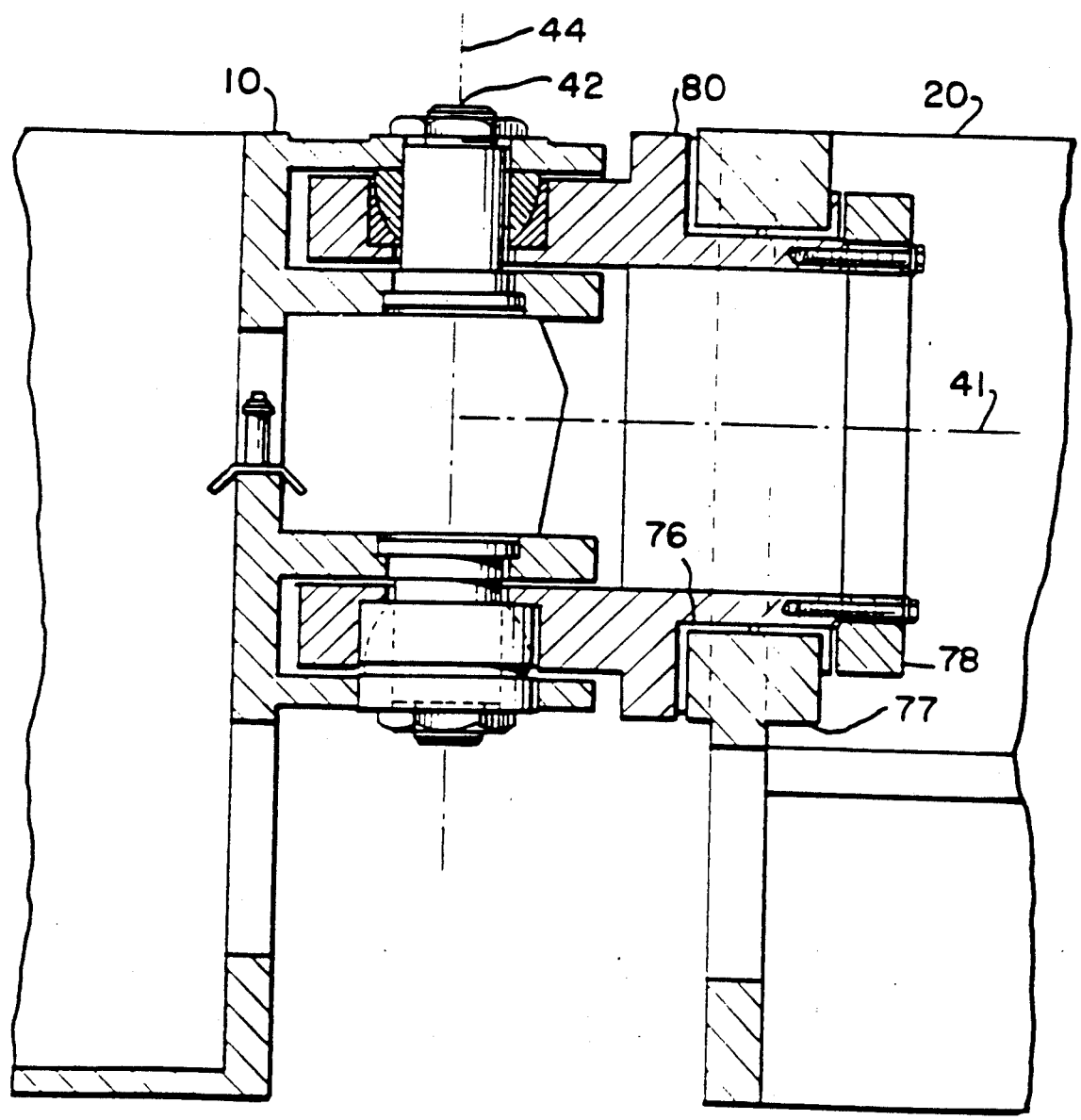
FIG. 3 is a view taken along line 3—3 of FIG. 1.

Referring to FIGS. 1 and 2 and particularly to FIG. 3, articulating means 40 for connecting main drive section 10 to battery section 20 comprises a pin and clevis assembly 42 rotatable about a vertical axis 44 of the pin section of the pin and clevis assembly. Movement is accomplished by two hydraulic steering cylinders 46 and 47 that are connected to the main drive section at joints 86 and 87, respectively, and to the battery section at joints 88 and 89, respectively. The operation of the cylinders moves the two sections relative to each other to provide steering and maneuvering capability as known in the art.

Clevis and pin assembly 42 is rigidly mounted on and connected to main section 10 and is rotatably connected to battery section 20 through a bearing assembly 80 having an annular bearing 76 that is movable around a bearing surface 77 having a retaining plate 78 mounted at the end. This enables the annular bearing to be rotatable about a longitudinal horizontal axis 41 so that the battery section connection is able to rotate relative to the main section as the two sections move relative to each other. This insures that the wheels of the battery section are always in contact with the ground irrespective of the relative position of the main section and the battery section.

In the operation of the lift vehicle, the operator maneuvers the machine to approach the roof support that is to be carried. Since lift plate 31 is movable laterally and the vehicle can be articulated there is great flexibility in entering into tight quarters to get under the support and operate within the limited space available. Lateral movement of the lift plate and the articulation are used to reach the appropriate positions for operation. The drag line may be used as required.

The lift plate 31 and its mounting structure is designed for the lift plate 31 to tilt to a substantial distance above and below the horizontal plane to not only enable it to lift a load such as a roof support, but also to engage the ground and raise the wheels 12 of the main drive section 10 off of the ground. When the vehicle 5 is in tight quarters the lift plate 31 can be tilted downward to lift the wheels 12 and then the lift plate 31 can be swung around the vertical axis 35 resulting in jacking the vehicle main drive section 10 sideways or laterally. This type of movement ability can be extremely useful in certain situations.

Because of the capability of the battery compartment to rotate relative to the main section movement over irregular terrain, the handling of large loads is accomplished without losing traction on one of the battery section wheels. This is true even when a heavy load is placed on the lift assembly and pin and clevis assembly 42 is raised. Lifting of the connection between the main section and the battery section does not lift up either side wheel of the rear section as in prior art arrangements. The rotation about the horizontal axial center line 41 insures that even when operating in a heavy load condition there will be four wheel traction available.

We claim:

1. A vehicle having a laterally moving lift for moving roof supports in mining and similar operations comprising:

an articulated vehicle including a main drive section and a second section connected to one end of the main drive section by a joint that allows the two vehicle sections to articulate relative to each other, each of said vehicle sections including mobile means for allowing it to travel over the ground and the main drive section including a body;

a lift plate assembly connected to the other end of the main drive section and including a lift plate extending forward from the main drive section for supporting and lifting a roof support of the type that covers a relatively large area and requires a supporting surface having a relatively large area for stable support, said lift plate having a generally flat horizontal upwardly facing lift surface similar to a table, and being relatively thin in order for it to be easily moved under objects resting on the ground that are to be lifted while supported on said upper surface, and extending horizontally across the width of the main drive section and forwardly of the main drive section for a distance similar to its width to provide a relatively large upper surface sufficient for supporting and lifting said roof supports in a stable orientation, said lift plate assembly including a structure connected to the rear edge of the lift plate and projecting vertically upward therefrom, a back plate assembly, swinging pivot means connecting the vertically upward projecting structure of the lift plate assembly to the back plate assembly for supporting the lift plate and allowing it to pivot on the back plate assembly about a vertical axis located generally near the rear edge of the lift plate at the vertically upward projecting structure so that the majority of the lift plate is located forward of the vertical axis, and swinging pivot means including a pair of vertically spaced pivoted joints interconnecting the lift plate assembly and the back plate assembly and aligned on said vertical axis, each of said pair of pivoted joints in the swinging pivot means including a ball and socket bearing and a pivot pin separate from the pivot pin of the other pivoted joint allowing the axes of the two pivoted joints to shift from aligned positions to accommodate any misalignment problems of the axes of the two pivoted joints during manufacture and to accommodate any bending of the back plate assembly such as during times of high stress of the lift plate assembly and back plate assembly;

a majority of said back plate assembly being located above said lift surface, swinging power means interconnected between said vertically upward projecting structure of the lift plate assembly and said back plate assembly for powering said lift plate about said vertical axis, tilting pivot means connecting the back plate assembly to the body of the main drive section for supporting the back plate assembly and allowing it to tilt on said body about a horizontal axis, and tilting power means interconnected between said back plate assembly and said body for powering said back plate assembly about said horizontal axis, said horizontal axis being located adjacent to the horizontal plane of the upwardly facing lift surface of said lift plate.

2. The vehicle of claim 1 wherein said swinging power means includes a pair of double acting hydraulic cylinders with each cylinder being located on the opposite side of the vertical axis from the other cylinder.

3. The vehicle of claim 2 wherein each cylinder is connected to the lift plate assembly and to the back plate assembly by respective joints, each of which joints includes a ball and socket bearing allowing said cylinder to pivot in a universal manner relative to the lift plate assembly and to the back plate assembly, respectively.

* * * * *